(12) United States Patent
Ando et al.

(10) Patent No.: US 10,381,157 B2
(45) Date of Patent: Aug. 13, 2019

(54) CERAMIC ELECTRONIC DEVICE

(71) Applicant: TDK CORPORATION, Tokyo (JP)

(72) Inventors: Norihisa Ando, Tokyo (JP); Katsumi Kobayashi, Tokyo (JP); Sunao Masuda, Tokyo (JP); Masahiro Mori, Tokyo (JP); Kayou Matsunaga, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/928,752

(22) Filed: Mar. 22, 2018

(65) Prior Publication Data

US 2018/0286584 A1    Oct. 4, 2018

(30) Foreign Application Priority Data

Mar. 23, 2017    (JP) .................... 2017-058036

(51) Int. Cl.
| | |
|---|---|
| *H01G 2/06* | (2006.01) |
| *H01G 4/005* | (2006.01) |
| *H01G 4/12* | (2006.01) |
| *H01G 4/30* | (2006.01) |
| *H01G 4/232* | (2006.01) |

(52) U.S. Cl.
CPC ............. *H01G 4/1227* (2013.01); *H01G 2/06* (2013.01); *H01G 4/005* (2013.01); *H01G 4/12* (2013.01); *H01G 4/232* (2013.01); *H01G 4/30* (2013.01); *H01G 2/065* (2013.01); *H01G 4/2325* (2013.01)

(58) Field of Classification Search
CPC .... H01G 4/1227; H01G 4/005; H01G 4/2324; H01G 4/232; H01G 4/248; H01G 4/30; H01G 2/065; H01G 2/06; H01G 2/02; H05K 3/3442
See application file for complete search history.

(56) References Cited

U.S. PATENT DOCUMENTS

| | | | |
|---|---|---|---|
| 6,288,887 B1 | 9/2001 | Yoshida et al. | |
| 6,381,117 B1 * | 4/2002 | Nakagawa | ............... H01G 2/14 361/301.4 |
| 6,683,782 B2 * | 1/2004 | Duva | .................... H01G 2/12 361/309 |

(Continued)

FOREIGN PATENT DOCUMENTS

| | | | | |
|---|---|---|---|---|
| JP | 07022274 A | * | 1/1995 | ............ H01G 2/065 |
| JP | 2000-235932 A | | 8/2000 | |

*Primary Examiner* — Nathan Milakovich
(74) *Attorney, Agent, or Firm* — Oliff PLC

(57) ABSTRACT

A ceramic electronic device includes a chip component and a pair of metal terminals. The component includes a rectangular-parallelepiped element body having dielectrics and internal electrodes and a pair of terminal electrodes covering end surfaces of the body and a part of side surfaces of the body. The pair of metal terminals respectively has an engagement arm portion configured to hold the component. The terminal electrode includes first and second side surfaces. The first side surface has a predetermined side-surface electrode thickness. The second side surface is disposed farther from the end surface of the body than the first side surface and has the side-surface electrode thickness which is smaller than that of the first side surface. The arm portion contacts with the component at a position that is farther from the end surface of the body than the first side surface.

6 Claims, 7 Drawing Sheets

(56) References Cited

U.S. PATENT DOCUMENTS

| | | | | |
|---|---|---|---|---|
| 7,331,799 B1* | 2/2008 | Lee | ............... | H01G 2/06 |
| | | | | 361/306.3 |
| 7,570,477 B2* | 8/2009 | Kayatani | ............... | H01G 4/2325 |
| | | | | 361/306.3 |
| 8,254,083 B2* | 8/2012 | Sakurai | ............... | B23K 1/0016 |
| | | | | 361/306.1 |
| 8,570,708 B2* | 10/2013 | Itagaki | ............... | H01G 4/30 |
| | | | | 361/301.4 |
| 9,042,079 B2* | 5/2015 | Masuda | ............... | H01G 4/01 |
| | | | | 361/301.2 |
| 9,355,775 B2* | 5/2016 | Itagaki | ............... | H01G 2/065 |
| 2015/0131202 A1* | 5/2015 | Masuda | ............... | H01G 4/38 |
| | | | | 361/301.4 |
| 2018/0040426 A1* | 2/2018 | Wakashima | ............... | H01G 4/248 |
| 2018/0197681 A1* | 7/2018 | Ando | ............... | H01G 2/06 |
| 2018/0211784 A1* | 7/2018 | Ando | ............... | H01G 2/06 |
| 2019/0080841 A1* | 3/2019 | Ando | ............... | H01G 2/065 |
| 2019/0080842 A1* | 3/2019 | Ando | ............... | H01G 4/232 |

* cited by examiner

CERAMIC ELECTRONIC DEVICE

BACKGROUND OF THE INVENTION

1. Field of the Invention

The present invention relates to a ceramic electronic device having a chip component and a metal terminal attached thereto.

2. Description of the Related Art

In addition to a normal chip component that is solely directly mounted on a board or so, a chip component attached with a metal terminal is proposed as a ceramic electronic device, such as a ceramic capacitor. It is reported that the ceramic electronic device attached with a metal terminal after being mounted has a reduction effect on a deformation stress that travels from a board to a chip component and a protection effect on a chip component from impacts or so. Thus, the ceramic electronic device attached with a metal terminal is used in a field where durability, reliability, and the like are required.

Patent Document 1: JP 2000-235932 A

SUMMARY OF THE INVENTION

In conventional ceramic electronic devices where a metal terminal is attached to a chip component, however, there may be a problem in that a connection between the chip component and the metal terminal is released by vibration or impact from outside, age-related degradation, and the like.

The present invention has been achieved under such circumstances. It is an object of the invention to provide a ceramic electronic device that may improve connection reliability between a chip component and a metal terminal.

To achieve the above object, the ceramic electronic device according to the present invention is a ceramic electronic device comprising:

a chip component including a rectangular-parallelepiped element body having dielectrics and internal electrodes and a pair of terminal electrodes covering end surfaces of the element body and a part of side surfaces of the element body; and a pair of metal terminals respectively having an engagement arm portion configured to hold the chip component and arranged correspondingly with the terminal electrodes, wherein the terminal electrode comprises:

a first side surface having a predetermined value of a side-surface electrode thickness representing a distance from the side surface of the element body to an external surface of the terminal electrode covering the side surface; and a second side surface disposed farther from the end surface of the element body than the first side surface and having the side-surface electrode thickness which is smaller than that of the first side surface, and wherein the engagement arm portion is in contact with the chip component at a position that is farther from the end surface of the element body than the first side surface.

The metal terminal of the ceramic electronic device according to the present invention has the engagement arm portion configured to hold the chip component, and the connection reliability between the chip component and the terminal electrode is thereby high, compared to conventional ceramic electronic devices where a metal terminal and a chip component is connected only by solder, conductive adhesive, or the like. In the present invention, the chip component and the metal terminal are connected by the engagement arm portion, and the connection between the chip component and the metal terminal by solder, conductive adhesive, or the like can thereby be weaker than prior arts or can thereby be omitted. In such a ceramic electronic device, it is thereby possible to prevent a vibration generated in the chip component from traveling to a mount board and to prevent an acoustic noise during use.

The terminal electrode of the metal terminal of the ceramic electronic device according to the present invention comprises the first side surface whose side-surface electrode thickness representing an electrode thickness on the side surface of the element body is large and the second side surface whose side-surface electrode thickness is small, and the engagement arm portion is in contact with the chip component at the position that is farther from the end surface than the first side surface. In such a ceramic electronic device, even if a force separating the chip component and the metal terminal is applied to the ceramic electronic device, the first side surface gets caught in the engagement arm portion, and the engagement between the engagement arm portion and the chip component can be prevented from being released. Thus, the ceramic electronic device according to the present invention has a high connection reliability between the chip component and the metal terminal. Whether the chip component and the metal terminal are attached appropriately can easily be determined by confirming the contact position between the engagement arm portion and the chip component and the position of the first side surface.

For example, the metal terminal may have a flat end-surface face portion facing an electrode end-surface portion of the terminal electrode covering the end surface of the element body, and a base end of the engagement arm portion may be connected with the end-surface face portion.

In the metal terminal portion, if there is a force that releases the engagement between the engagement arm portion and the chip component in a direction where the electrode end surface and the end-surface face portion are separated, the first side surface gets caught in the engagement arm portion, and the engagement between the engagement arm portion and the chip component can effectively be prevented from being released.

For example, a tip of the engagement arm portion may be provided with a bouncing portion extending away from the chip component.

The bounding portion is formed at the tip of the engagement arm portion, and the engagement arm portion can thereby smoothly be engaged with the chip component. Thus, assembled easily is the ceramic electronic device using the metal terminal with the bouncing portion at the tip of the engagement arm portion.

For example, the terminal electrode may be provided with a step portion existing between the first side surface and the second side surface and having the side-surface electrode thickness decreasing in a stepped manner from the first side surface to the second side surface.

When the step portion is formed between the first side surface and the second side surface, if a force that separates the chip component and the metal terminal is applied to the ceramic electronic device, the step portion strongly gets caught in the engagement arm portion, and it is thereby possible to effectively prevent the release of the engagement between the engagement arm portion and the chip component.

For example, the engagement arm portion may be in contact with the terminal electrode at a position that is farther from the end surface of the element body than the first side surface.

The engagement arm portion may be in contact with the terminal electrode or the element body. When the engagement arm portion is in contact with the terminal electrode, the conduction between the metal terminal and the chip component can be secured via the engagement arm portion. Due to such a structure, the amount used of solder, conductive adhesive, or the like can be reduced or the use thereof can be eliminated For example, the engagement arm portion may be in contact with the second side surface.

When the engagement arm portion is in contact with the second side surface, the contact portion of the engagement arm portion is disposed closer to the element body than the external surface of the first side surface, and even if a sudden force that separates the chip component and the metal terminal is applied, the engagement arm portion thereby definitely gets caught in the first side surface, and it is thereby possible to effectively prevent the release of the engagement between the engagement arm portion and the chip component.

DESCRIPTION OF THE PREFERRED EMBODIMENTS

Hereinafter, an embodiment of the present invention is described based on figures.

Figure 1:
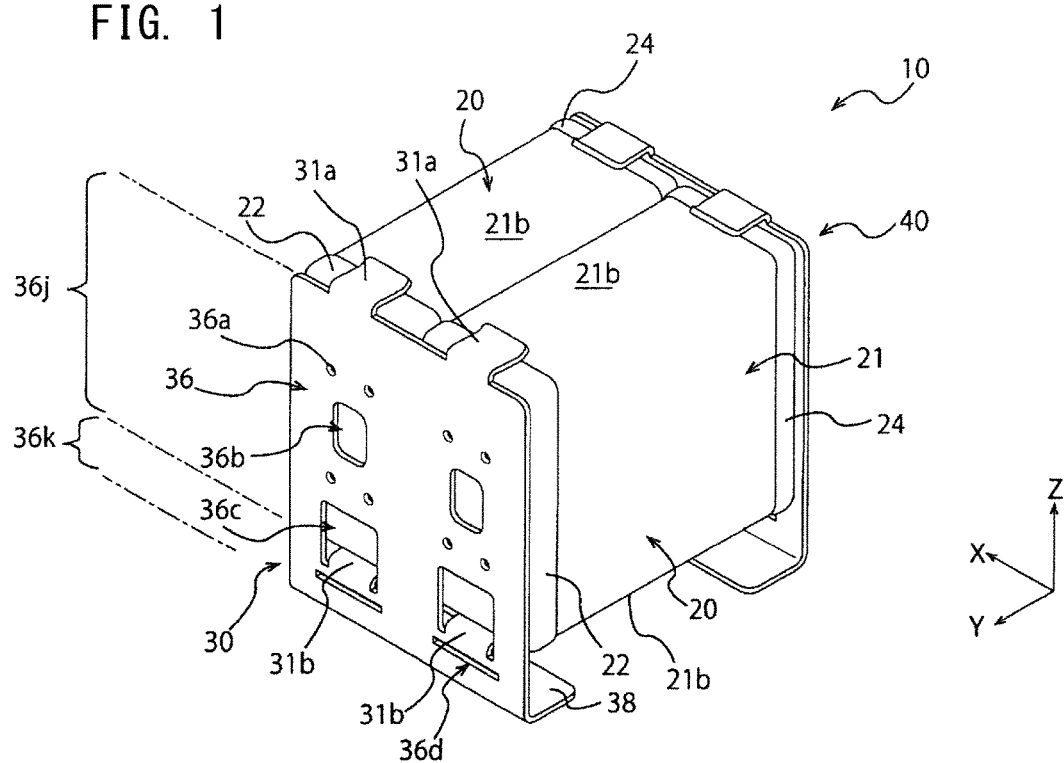
FIG. 1 is a schematic perspective view showing a ceramic electronic device according to the embodiment of the present invention.

FIG. 1 is a schematic perspective view showing a ceramic capacitor 10 according to an embodiment of the present invention. The ceramic capacitor 10 has chip capacitors 20 as chip components and a pair of metal terminals 30 and 40. The ceramic capacitor 10 according to the embodiment has the two chip capacitors 20, but the ceramic capacitor 10 has any number of chip capacitors 20. That is, the ceramic capacitor 10 may have one or more chip capacitors 20.

Incidentally, the embodiment is described with a ceramic capacitor where the chip capacitors 20 are equipped with the metal terminals 30 and 40, but the ceramic electronic device of the present invention is not limited to the ceramic capacitor, and may be a chip component other than capacitors equipped with the metal terminals 30 and 40. In the description of the embodiment, as shown in FIG. 1 to FIG. 5, the Z-axis direction is a vertical direction to a mounting surface where the ceramic capacitor 10 is mounted, the Y-axis direction is a direction where a pair of end surfaces 21aa and 21ab (see FIG. 4) of an element body 21 of the chip capacitor 20 is connected to each other, and the X-axis direction is a vertical direction to the Z-axis direction and the Y-axis direction.

Figure 3:
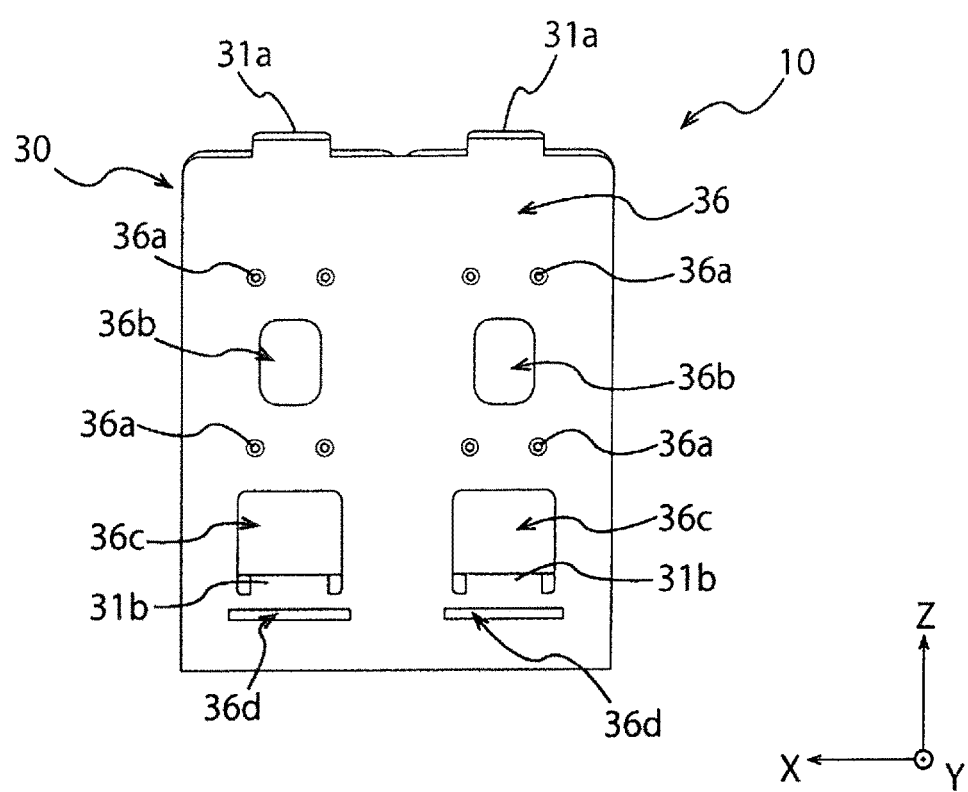
FIG. 3 is a left side view of the ceramic electronic device shown in FIG. 1.
Figure 4:
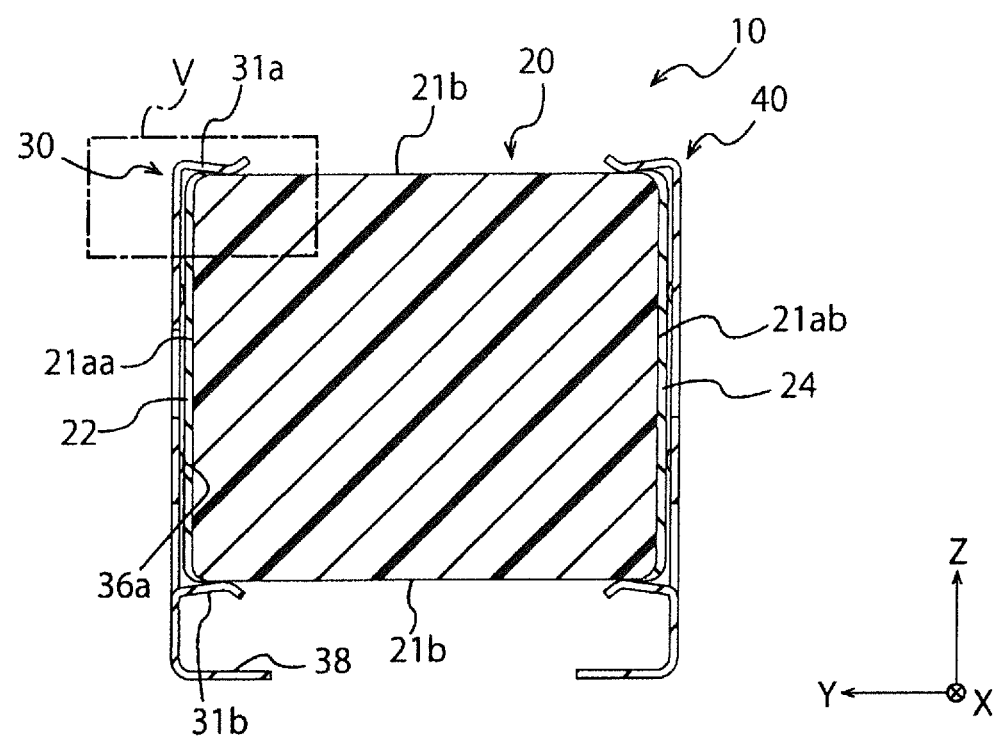
FIG. 4 is a cross-sectional view of the ceramic electronic device shown in FIG. 1.

The chip capacitors 20 have an approximately rectangular parallelepiped shape, and the two chip capacitors 20 included in the ceramic capacitor 10 have approximately the same shape and size. The chip capacitor 20 has the element body 21 with a rectangular parallelepiped shape and a pair of terminal electrodes 22 and 24 covering the pair of end surfaces 21aa and 21ab of the element body 21. As shown in FIG. 4, which is a cross-sectional view, the end surfaces 21aa and 21ab of the element body 21 are entirely covered with the terminal electrodes 22 and 24, and are not illustrated in any of FIG. 1 to FIG. 3, which are external views.

The chip capacitors 20 are arranged so that the end surfaces 21aa and 21ab of the element body 21 are vertical to the mounting surface, in other words, sides of the element body 21 connecting between the end surfaces 21aa and 21ab are parallel to the mounting surface of the ceramic capacitor 10. Incidentally, the mounting surface of the ceramic capacitor 10 is a surface attached with the ceramic capacitor 10 by solder or so and facing mount portions 38 of the metal terminals 30 and 40 mentioned below.

The element body 21 of the chip capacitor 20 shown in FIG. 4 includes dielectrics and internal electrodes. In the element body 21, dielectric layers, which are layers of dielectrics, and internal electrode layers, which are layers of internal electrodes, are laminated alternately in the X-axis direction, which is the lamination direction. Some of the internal electrode layers are electrically connected to the terminal electrode 22, and the other internal electrode layers are electrically connected to the terminal electrode 24.

The dielectric layers of the element body 21 are composed of any dielectric material, such as calcium titanate, strontium titanate, barium titanate, and a mixture thereof. The dielectric layer has any thickness, but normally has a thickness of several μm to several hundred μm. In the present embodiment, the dielectric layer preferably has a thickness of 1.0 to 5.0 μm. The dielectric layers preferably have a main component of barium titanate, which can increase capacitance of capacitors.

The internal electrode layers contain any conductive material, but may contain a comparatively inexpensive base metal when the dielectric layers are composed of a reduction resistant material. The base metal is preferably Ni or a Ni alloy. The Ni alloy is preferably an alloy of Ni and one or more elements of Mn, Cr, Co, and Al, and preferably contains Ni at 95 wt % or more. Incidentally, Ni or the Ni alloy may contain various fine components, such as P, at about 0.1 wt % or less. The internal electrode layers may be formed using a commercially available electrode paste. Each of the internal electrode layers has a thickness appropriately determined based on usage or so.

Figure 2:
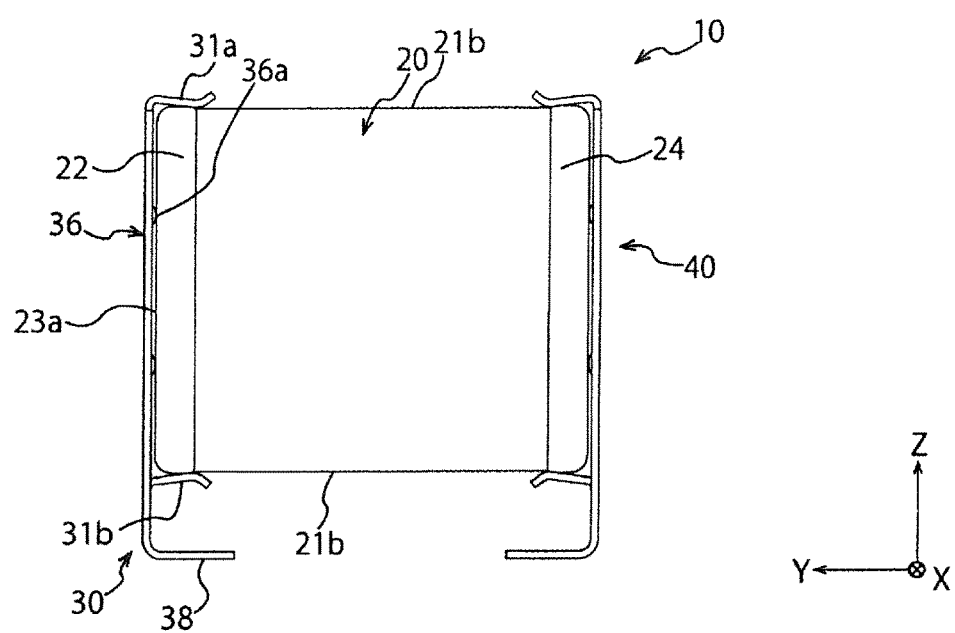
FIG. 2 is a front view of the ceramic electronic device shown in FIG. 1.
Figure 5:
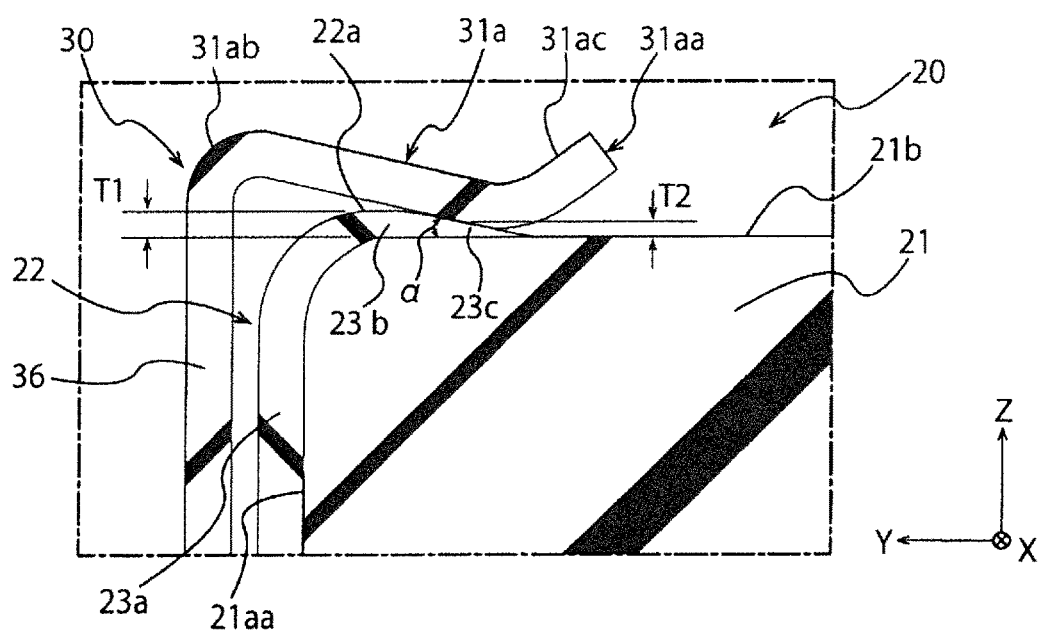
FIG. 5 is a partially enlarged view of the cross-sectional view shown in FIG. 4.

As shown in FIG. 2 and FIG. 4, the terminal electrodes 22 and 24 of the chip capacitor 20 are arranged to cover the pair of end surfaces 21aa and 21ab of the element body 21. The terminal electrode 22, which is one of the pair of terminal electrodes 22 and 24, covers the whole of the end surface 21aa of the element body 21 on the positive side in the Y-axis direction and a part of side surfaces 21b of the element body 21 connecting between the pair of end surfaces 21aa and 21ab. As shown in FIG. 5, the terminal electrode 22 is continuous from an electrode end surface 23a covering the end surface 21aa to a first side surface 23b and a second side surface 23c covering a part of the side surfaces 21b.

The terminal electrode 24, which is the other terminal electrode of the pair of terminal electrodes 22 and 24, covers the whole of the end surface 21*ab* of the element body 21 on the negative side in the Y-axis direction and a part of side surfaces 21*b* of the element body 21 connecting between the pair of end surfaces 21*aa* and 21*ab*. The terminal electrode 24 has a symmetrical shape to the terminal electrode 22, and is continuous from a portion covering the end surface 21*ab* to a portion covering a part of the side surfaces 21*b*.

As shown in FIG. 2, the terminal electrodes 22 and 24 are apart from each other, and a part of the side surfaces 21*b* of the element body 21 is exposed from the terminal electrodes 22 and 24. The terminal electrodes 22 and 24 are not conductive because at least a portion of the external surface of the element body 21 exposed on the side surfaces 21*b* is composed of insulation material, and because the terminal electrodes 22 and 24 are arranged separately with a sufficient distance for security of electric insulation.

As shown in FIG. 1, the pair of metal terminals 30 and 40 is arranged correspondingly to the terminal electrodes 22 and 24 of the chip capacitor 20. That is, the metal terminal 30 is disposed correspondingly to the terminal electrode 22 on the positive side in the Y-axis direction, and the metal terminal 40 is disposed correspondingly to the terminal electrode 24 on the negative side in the Y-axis direction.

The metal terminal 30 has a flat end-surface face portion 36, at least a pair (two pairs in the embodiment) of engagement arm portions 31*a* and 31*b*, and a mount portion 38. The end-surface face portion 36 faces the electrode end surface 23*a* of the terminal electrode 22 covering the end surface 21*aa* of the element body 21. The engagement arm portions 31*a* and 31*b* hold the chip capacitor 20. The mount portion 38 extends from the end-surface face portion 36 toward the chip capacitor 20 and is approximately vertical to the end-surface face portion 36.

As shown in FIG. 1, the end-surface face portion 36 of the metal terminal 30 extends in the Z-axis direction, which is vertical to the mounting surface. The end-surface face portion 36 may electrically and mechanically be connected with the terminal electrodes 22 facing the end-surface face portion 36. For example, the end-surface face portion 36 and the terminal electrodes 22 can be connected with each other by arranging a conductive connection member, such as a solder and a conductive adhesive, in a space between the end-surface face portion 36 and the terminal electrodes 22. When the metal terminal 30 and the terminal electrodes 22 are connected electrically by contact portions between the terminal electrodes 22 and upper and lower arm portions 31*a* and 31*b* mentioned below, however, connection members between the end-surface face portion 36 and the terminal electrodes 22 may be a non-conductive adhesive or so, such as an epoxy resin and a phenol resin.

First through holes 36*b* are formed on portions of the end-surface face portion 36 facing the terminal electrodes 22. Two first through holes 36*b* are formed correspondingly with the chip capacitors 20 contained in the ceramic capacitor 10, but any shape and number of the first through holes 36*b* may be formed. The first through holes 36*b* may be provided with connection members connecting between the end-surface face portion 36 and the terminal electrodes 22. The connection members are preferably composed of a conductive material, such as a solder and a conductive adhesive. For example, a connection member composed of a solder forms a solder bridge between a periphery of the first through hole 36*b* and the terminal electrode 22, and the end-surface face portion 36 and the terminal electrode 22 can thereby strongly be joined.

The end-surface face portion 36 is provided with a plurality of protrusions 36*a* protruding toward the terminal portions 22 of the chip capacitors 20 and touching the terminal portions 22. The protrusions 36*a* reduce a contact area between the end-surface face portion 36 and the terminal electrodes 22. This makes it possible to prevent a vibration generated in the chip capacitors 20 from traveling to the mount board via the metal terminal 30 and prevent an acoustic noise of the ceramic capacitor 10.

A formation range of the connection member, such as a solder, can be adjusted by forming the protrusions 36*a* around the first through holes 36*b*. In such a ceramic capacitor 10, an acoustic noise can be prevented while a connection strength between the end-surface face portion 36 and the terminal electrodes 22 is adjusted in an appropriate range. Incidentally, as shown in FIG. 3, four protrusions 36*a* are formed around one first through hole 36*b* in the ceramic capacitor 10, but any number and arrangement of the protrusions 36*a* may be employed.

The end-surface face portion 36 is provided with second through holes 36*c* below the first through holes 36*b*. A periphery portion of the second through hole 36*c* is connected with the lower arm portion 31*b* constituting the engagement arm portions along with the upper arm portion 31*a*. The second through holes 36*c* are positioned closer to the mount portion 38 than the first through holes 36*b*. Unlike the first through holes 36*b*, the second through holes 36*c* are not provided with any connection member, such as a solder.

The vicinities of the lower arm portions 31*b* supporting the chip capacitors 20 have an easily deformable shape, and the metal terminal 30 with the second through holes 36*c* can thereby effectively demonstrate a reduction effect on a stress generated in the ceramic capacitor 10 and an absorption effect on a vibration of the chip capacitors 20. Thus, the ceramic capacitor 10 having the metal terminal 30 can favorably prevent an acoustic noise and have a favorable connection reliability with the mount board when being mounted.

In the end-surface face portion 36, the second through hole 36*c* connected with the lower arm portion 31*b* is formed with a predetermined distance in the height direction (Z-axis direction) against the mount portion 38, and a slit 36*d* is formed between the second through hole 36*c* and the connection position of the mount portion 38. The slits 36*d* can prevent a solder used at the time of mounting the ceramic capacitor 10 on a mount board from creeping up on the end-surface face portion 36, and can prevent the solder from being connected with the lower arm portions 31*b* and the terminal electrode 22. Thus, the ceramic capacitor 10 with the slits 36*d* demonstrates a prevention effect on acoustic noise.

As shown in FIG. 1, the end-surface face portion 36 has a plate element body part 36*j* and a terminal connection part 36*k*. The plate element body part 36*j* faces the terminal electrodes 22 of the chip capacitors 20 and is positioned at a height overlapping with the chip capacitors 20. The terminal connection part 36*k* is positioned below the plate element body part 36*j* and connects between the plate element body part 36*j* and the mount portion 38. The second through holes 36*c* are formed so that their periphery portions range the plate element body part 36*j* and the terminal connection part 36*k*. The lower arm portions 31*b* extend from the terminal connection part 36*k*. That is, bases of the lower arm portions 31*b* are connected with lower sides of approximately rectangular periphery portions of the second through holes 36*c*, and the lower arm portions 31*b* extend from their bases toward above (positive side in the Z-axis direction) and inside (negative side in the Y-axis direction) while being bent, touch the bottom surfaces of the chip capacitors 20, and support the chip capacitors 20 from below.

The engagement arm portion consists of the upper arm portion 31*a* and the lower arm portion 31*b*. In the ceramic capacitor 10, a pair of one upper arm portion 31*a* and one lower arm portion 31*b* holds one chip capacitor 20. Since the pair of arm portions 31*a* and 31*b* holds one chip capacitor 20, not multiple chip capacitors 20, the metal terminal 30 can definitely hold each of the chip capacitors 20.

The upper arm portion 31*a* is connected with the upper end (end on the positive side in the Z-axis direction) of the end-surface face portion 36, and the lower arm portion 31*b* is connected with a periphery of the second through hole 36*c* of the end-surface face portion 36. Incidentally, the pair of upper arm portion 31*a* and lower arm portion 31*b* holding the chip capacitor 20 may have mutually asymmetry shapes and mutually different lengths in the width direction (lengths in the X-axis direction). Since the lower arm portions 31*b* extend from the terminal connection part 36*k*, shorter is a transmission path between the terminal electrodes 22 of the chip capacitors 20 and the mount board, compared to when the lower arm portions 31*b* are connected with the plate element body part 36*j*.

The mount portion 38 is connected with the lower end (end on the negative side in the Z-axis direction) of the end-surface face portion 36. The mount portion 38 extends from the end-surface face portion 36 toward the chip capacitors 20 (negative side in the Y-axis direction) and is bent approximately vertically to the end-surface face portion 36. Incidentally, the top surface of the mount portion 38, which is a surface of the mount portion 38 closer to the chip capacitors 20, preferably has a solder wettability that is lower than a solder wettability of the bottom surface of the mount portion 38 in order to prevent an excessive scattering of a solder used when the chip capacitors 20 are mounted on a board.

As shown in FIG. 1, the metal terminal 40 is arranged symmetrically to the metal terminal 30, and is different from the metal terminal 30 in arrangement against the chip capacitors 20. The metal terminal 40 is, however, different from the metal terminal 30 only in arrangement against the chip capacitors 20 and has a similar shape to the metal terminal 30. Thus, the metal terminal 40 is not described in detail.

FIG. 5 is a partially enlarged view of the cross-sectional view shown in FIG. 4, and illustrates a detailed structure of the upper arm portion 31*a* and the terminal electrode 22. As shown in FIG. 5, the terminal electrode 22 has the first side surface 23*b* and the second side surface 23*c*. The first side surface 23*b* covers a part of the side surface 21*b* disposed parallel to the mounting surface among the side surfaces of the element body 21. The second side surface 23*c* covers the other part of the side surface 21*b*. The first side surface 23*b* is closer to the end surface 21*aa* of the element body 21 covered with the electrode end surface 23*a* of the terminal electrode 22, compared to the second side surface 23*c*. The second side surface 23*c* is disposed away from the end surface 21*aa* of the element body 21 covered with the electrode end surface 23*a* connected with the first and second side surfaces 23*b* and 23*c*, compared to the first side surface 23*b*.

As shown in FIG. 5, the first side surface 23*b* has T1, which is a side-surface electrode thickness representing a distance from the side surface 21*b* of the element body 21 to an external surface 22*a* of the terminal electrode 22 covering the side surface 21*b* of the element body 21. Likewise, the second side surface 23*c* has T2, which is a side-surface electrode thickness and is smaller than T1.

The upper arm portion 31*a*, which is one of the engagement arm portion, is in contact with the terminal electrode 22 of the chip capacitor 20 at a position that is farther from the end surface 21*aa* of the element body 21 than the first side surface 23*b*. In the example shown in FIG. 5, the upper arm portion 31*a* is in contact with the second side surface 23*c* of the terminal electrode 22. As shown in FIG. 5, the second side surface 23*c* in contact with the upper arm portion 31*a* has a slope whose side-surface electrode thickness increases from the center of the chip capacitor 20 toward the end surface 21*aa* of the element body 21. The angle α of the slope of the second side surface 23*c* is not limited, but may be 2.5 to 20 degrees, for example.

As described above, the upper arm portion 31*a* is in contact with the chip capacitor 20 at a position that is farther from the end surface 21*aa* of the element body 21 than the first side surface 23*b*, that is, at a position that is closer to the center of the chip capacitor 20 than the first side surface 23*b*. In the ceramic capacitor 10, even if a force separating the chip capacitor 20 and the metal terminal 30 is applied, since the first side surface 23*b* has a large side-surface electrode thickness and protrudes from the element body 21, the first side surface 23*b* functions as a stopper that prevents the engagement of the upper arm portion 31*a* from being released, and can prevent the release of the engagement between the upper arm portion 31*a* and the chip capacitor 20.

In the ceramic capacitor 10 having the upper arm portion 31*a* shown in FIG. 5, the upper arm portion 31*a* is in contact with the terminal electrode 22, and the conduction between the metal terminal 30 and the chip capacitor 20 can thereby be secured via the upper arm portion 31*a*. In the ceramic capacitor 10, the amount used of solder, conductive adhesive, or the like can be reduced or the use thereof can be eliminated. Since the conduction between the metal terminal 30 and the chip capacitor 20 is secured via the upper arm portion 31*a*, the amount used of solder, conductive adhesive, or the like joining between the end-surface face portion 36 of the metal terminal 30 and the electrode end surface 23*a* of the chip capacitor 20 can be reduced or the use thereof can be eliminated. In such a ceramic capacitor 10, a vibration traveling from the chip capacitor 20 to the mount board can be reduced, and acoustic noise can be prevented.

A base end 31*ab* of the upper arm portion 31*a* is disposed at a position (upper part in FIG. 5) that is farther from the side surface 21*b* of the element body 21 than the first side surface 23*b* of the terminal electrode 22 in the Z-axis direction. Thus, the upper arm portion 31*a* is in contact with the second side surface 23*c* or the side surface 21*b* of the element body 21 at a position that is farther from the end surface 21*aa* of the element body 21 than the first side surface 23*b* in the Y-axis direction, and can hold the chip capacitor 20.

Since the upper arm portion 31*a* is in contact with the second side surface 23*c* having the slope, the engagement force by the upper arm portion 31*a* acts in a direction where the chip capacitor 20 is pushed against the end-surface face portion 36 of the metal terminal 30. In the ceramic capacitor 10, the metal terminal 30 can thereby securely hold the chip capacitor 20.

In the ceramic capacitor 10, where the upper arm portion 31*a* is in contact with the second side surface 23*c*, as shown in FIG. 5, the contact portion of the upper arm portion 31*a* with the second side surface 23*c* is disposed closer to the side surface 21b of the element body 21 than the external surface of the first side surface 23b. Thus, even if a sudden force that separates the chip capacitor 20 and the metal terminal 30 is applied, the upper arm portion 31a definitely gets caught in the first side surface 23b, and it is thereby possible to effectively prevent the release of the engagement between the upper arm portion 31a and the chip capacitor 20.

As shown in FIG. 5, the base end 31ab of the upper arm portion 31a is connected with the end-surface face portion 36 facing the electrode end surface 23a of the chip capacitor 20. That is, the upper arm portion 31a extends from outside the first side surface 23b toward the center of the chip capacitor 20 over the first side surface 23b, and a vicinity of a tip 31aa of the upper arm portion 31a is in contact with the second side surface 23c of the chip capacitor 20. In the ceramic capacitor 10, the terminal electrode 22 of the chip capacitor 20 is housed in a space surrounded by the engagement arm portions 31a and 31b and the end-surface face portion 36, and if an external force is applied, the terminal electrode 22 is prevented from going out from the space by engagement between the engagement arm portions 31a and 31b and the first side surface 23b, whereby it is possible to effectively prevent the release of the engagement between the metal terminal 30 and the chip capacitor 20.

As shown in FIG. 5, the tip 31aa of the engagement arm portion 31a is provided with a bouncing portion 31ac extending away from the side surface 21b of the chip capacitor 20 toward the tip 31aa. When the metal terminal 30 having the bouncing portion 31ac at the tip 31aa of the engagement arm portion 31a is attached to the chip capacitor 20, the bouncing portion 31ac functions as a guide, and the engagement arm portion 31a is elastically deformed only by moving the terminal electrode 22 of the chip capacitor 20 closer to the end-surface face portion 36 of the metal terminal 30, whereby the terminal electrode 22 of the chip capacitor 20 can be held. Thus, the ceramic capacitor 10 is assembled easily.

In the ceramic capacitor 10 according to the present embodiment, the lower arm portion 31b and the terminal electrode 22 in the vicinity of the contact position with the lower arm portion 31b shown in FIG. 4 also have features similar to those of the upper arm portion 31a and the terminal electrode 22 shown in FIG. 5. The metal terminal 40 and the terminal electrode 24 held by the metal terminal 40 shown in FIG. 4 are similar to the metal terminal 30 and the terminal electrode 22 shown in FIG. 5 etc. Incidentally, the present invention is not limited to the embodiment, and may be characterized in that, for example, only a part of the engagement arm portions 31a and 31b and the terminal electrodes 22 and 24 in contact therewith has the features explained with FIG. 5.

As shown below, for example, the ceramic capacitor 10 can be manufactured by preparing the chip capacitor 20 and the metal terminals 30 and 40 and assembling them.

In the manufacture of the chip capacitor 20, a laminated body is prepared by laminating green sheets with electrode patterns to be the internal electrode layers after firing, and the element body 21 as a capacitor element body is obtained by pressurizing and firing the laminated body obtained. Moreover, the terminal electrodes 22 and 24 are formed on the element body 21 by baking, plating, etc., and the chip capacitor 20 is thereby obtained.

For example, the metal terminals 30 and 40 are manufactured by machining a metal plate material. For example, a plate material of iron, nickel, copper, silver, or an alloy thereof is prepared and machined into a predetermined shape, and is thereafter subjected to a plating treatment of Ni, Sn, Cu, etc. as necessary, and the metal terminals 30 and 40 are thereby obtained. In the plating treatment, a resist treatment against a top surface of the mount portion 38 can prevent the plating from attaching to the top surface of the mount portion 38. This makes it possible to generate a difference in solder wettability between the top surface and the bottom surface of the mount portion 38.

Two chip capacitors 20 obtained in the above-mentioned manner are prepared, and are arranged and held as shown in FIG. 1. Then, the metal terminals 30 and 40 are respectively attached to the terminal electrodes 22 and 24. Moreover, a connection member, such as a solder, is applied to the first through holes 36b of the metal terminals 30 and 40 so as to electrically and mechanically connect between the metal terminals 30 and 40 and the terminal electrodes 22 and 24. Then, the ceramic capacitor 10 is obtained.

The present invention is accordingly described with the embodiment. Needless to say, the present invention is not limited to the above-mentioned embodiment and includes other variations. In the embodiment shown in FIG. 1, for example, the engagement arm portions 31a and 31b hold the side surfaces 21b, which are horizontal to the mounting surface, of the side surfaces of the element body 21 of the chip capacitor 20 in a direct manner or via the terminal electrode 22, but the engagement arm portions are not limited to holding the chip capacitor 20 in this direction, and may hold side surfaces of the element body 21 that is vertical to the mounting surface. In a ceramic capacitor according to First Variation of the present invention shown in FIG. 6, for example, a terminal electrode 122 of a chip capacitor 120 is different from the terminal electrode 22 shown in FIG. 4 in shape.

Figure 6:
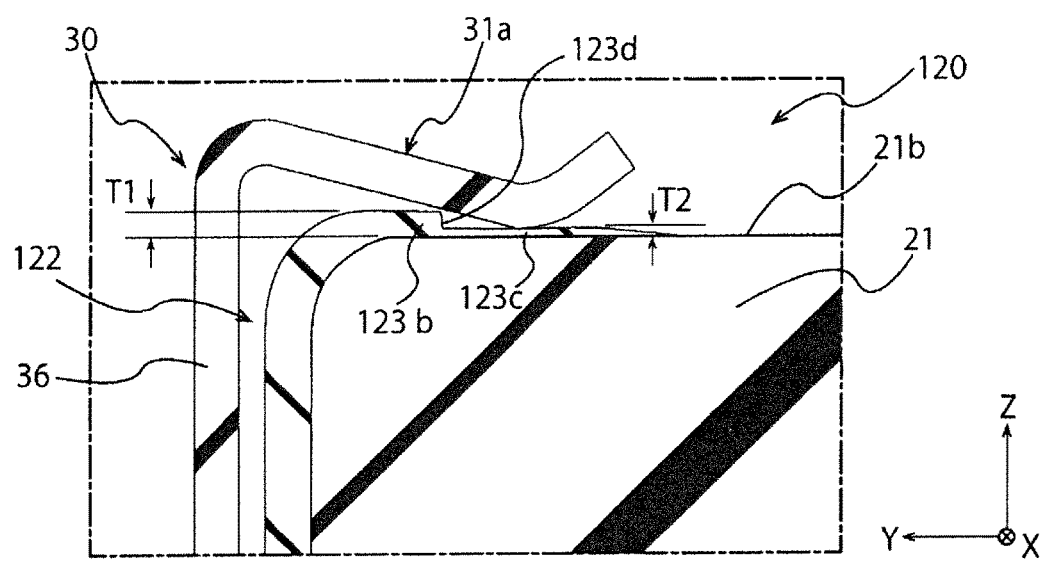
FIG. 6 is a partially enlarged view of a ceramic electronic device according to First Variation.

As shown in FIG. 6, the terminal electrode 122 included in the ceramic capacitor according to First Variation has a step portion 123d between a first side surface 123b whose side-surface electrode thickness is T1 and a second side surface 123c whose side-surface electrode thickness is T2. The step portion 123d takes an extreme value in change of side-surface electrode thickness per unit length from the first side surface 123b to the second side surface 123c (decreasing rate in thickness), and the side-surface electrode thickness decreases in a stepped manner at the step portion 123d. The step formed at the step portion 123d is not limited, but may be about 0.005 to 0.2 mm, for example. In First Variation including the terminal electrode 122 with the step portion 123d shown in FIG. 6, if a force that separates the chip capacitor 120 and the metal terminal 30 is applied to the ceramic capacitor, the step portion 123d strongly gets caught in the upper arm portion 31a, and it is thereby possible to effectively prevent the release of the engagement between the upper arm portion 31a and the chip capacitor 120.

Incidentally, the ceramic capacitor according to First Variation is similar to the ceramic capacitor 10 shown in FIG. 1 to FIG. 5 except for the shape of the terminal electrode 122 shown in FIG. 6, and common matters with the ceramic capacitor 10 are thereby not explained. The ceramic capacitor according to First Variation demonstrates effects similar to those of the ceramic capacitor 10 according to the embodiment.

Figure 7:
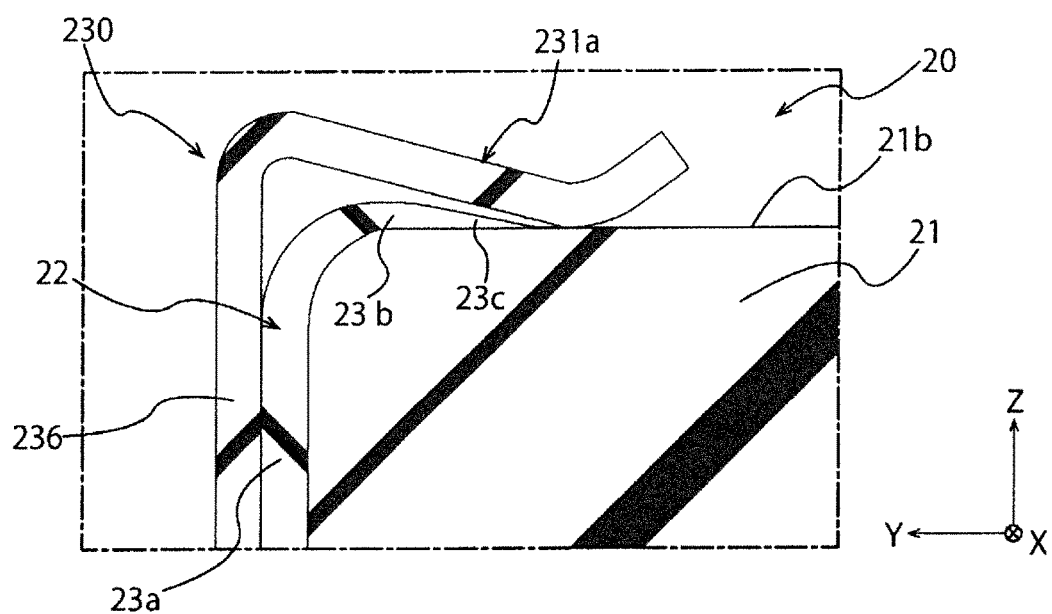
FIG. 7 is a partially enlarged view of a ceramic electronic device according to Second Variation.

FIG. 7 is an enlarged cross-sectional view showing an arrangement of the chip capacitor 20 and a metal terminal 230 included in a ceramic capacitor according to Second Variation of the present invention. The ceramic capacitor according to Second Variation is similar to the ceramic capacitor 10 according to the embodiment except for the metal terminal 230, and common matters with the ceramic capacitor 10 are thereby not explained.

In Second Variation shown in FIG. 7, an upper arm portion 231a is not in contact with the terminal electrode 22, but is in contact with the side surface 21b of the element body 21 at a position that is closer to the center of the chip capacitor 20 than the first side surface 23b and the second side surface 23c. In the ceramic capacitor of Second Variation, if a force that separates the chip capacitor 20 and the metal terminal 230 is applied, the first side surface 23b gets caught in the upper arm portion 231a and functions as a stopper that prevents the engagement of the upper arm portion 231a from being released, and it is thereby possible to prevent the release of the engagement between the upper arm portion 231a and the chip capacitor 20. As a result, the ceramic capacitor of Second Variation demonstrates effects similar to those of the ceramic capacitor 10 according to the embodiment.

Incidentally, since the upper arm portion 231a is not in contact with the terminal electrode 22, the conduction between the metal terminal 230 and the chip capacitor 20 is secured by connecting between the terminal electrode 22 and a portion other than the upper arm portion 231a, such as a portion between an end-surface face portion 236 and the terminal electrode 22.

NUMERICAL REFERENCES

10 . . . ceramic capacitor
20, 120 . . . chip capacitor
21 . . . element body
21aa, 21ab . . . end surface
21b . . . side surface
22, 24, 122 . . . terminal electrode
22a . . . external surface
23a . . . electrode end surface
23b, 123b . . . first side surface
23c, 123c . . . second side surface
123d . . . step portion
T1, T2 . . . side-surface electrode thickness
30, 40, 230 . . . metal terminal
31a, 231a . . . upper arm portion
31aa . . . tip
31ab . . . base end
31ac . . . bouncing portion
31b . . . lower arm portion
36, 236 . . . end-surface face portion
36a . . . protrusion
36b . . . first through hole
36c . . . second through hole
36d . . . slit
36j . . . plate element body part
36k . . . terminal connection part

The invention claimed is:

1. A ceramic electronic device comprising:
a chip component including a rectangular-parallelepiped element body having dielectrics and internal electrodes and a pair of terminal electrodes, each of the pair of terminal electrodes having an electrode end-surface portion covering one of a pair of end surfaces of the element body and a side surface portion covering portions of side surfaces of the element body, the side surfaces connecting between the pair of end surfaces; and
a pair of metal terminals each respectively having a pair of engagement arm portions configured to hold the chip component and arranged correspondingly with the pair of terminal electrodes,
wherein the side surface portion of each of the pair of terminal electrodes comprises:
a first side surface portion having a predetermined value of a side-surface electrode thickness representing a distance from the side surfaces of the element body covered by the side surface portion of the terminal electrode to an external surface of the side surface portion of the terminal electrode covering the side surfaces of the element body; and
a second side surface portion disposed farther from the end surface of the element body than the first side surface portion and having electrode second thickness which is smaller than the predetermined value of the side-surface electrode thickness,
wherein each of the pair of engagement arm portions of each of the pair of metal terminals is in contact with the chip component at a position that is farther from the associated end surface of the element body than the associated first side surface portion and closer to one of the side surfaces of the element body than the external surface of the associated first side surface portion, and
the first side surface portion of each of the pair of terminal electrodes has the predetermined value of the side-surface electrode thickness to catch the associated engagement arm portion of the respective metal terminal when the associated engagement arm portion is positioned past the associated end surface of the element body.

2. The ceramic electronic device according to claim 1, wherein each of the pair of metal terminals has a flat end-surface face portion facing the associated electrode end-surface portion of the associated terminal electrode, and
wherein a base end of each of the pair of engagement arm portions is connected with the associated end-surface face portion.

3. The ceramic electronic device according to claim 1, wherein a tip of each of the pair of engagement arm portions is provided with a tab extending away from the chip component.

4. The ceramic electronic device according to claim 1, wherein each of the pair of terminal electrodes is provided with a step portion existing between the associated first side surface portion and the associated second side surface portion and having the predetermined value of the side-surface electrode thickness decreasing in a stepped manner from the associated first side surface portion to the associated second side surface portion.

5. The ceramic electronic device according to claim 1, wherein each of the pair of engagement arm portions is in contact with the associated terminal electrode at a position that is farther from the associated end surface of the element body than the associated first side surface portion.

6. The ceramic electronic device according to claim 5, wherein each of the pair of engagement arm portions is in contact with the associated second side surface portion.

* * * * *